Figure 1:
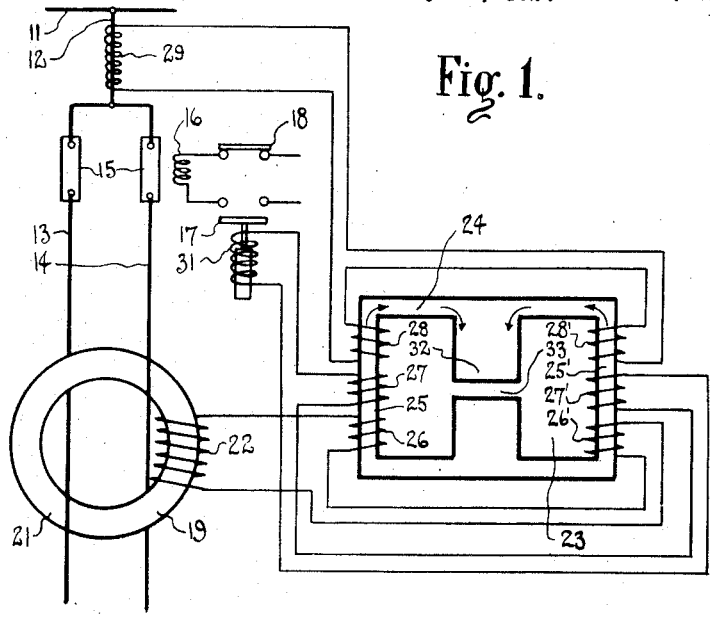

May 26, 1925.

A. S. FITZ GERALD

PROTECTIVE APPARATUS

Filed May 23, 1924

1,539,658

3 Sheets-Sheet 1

INVENTOR

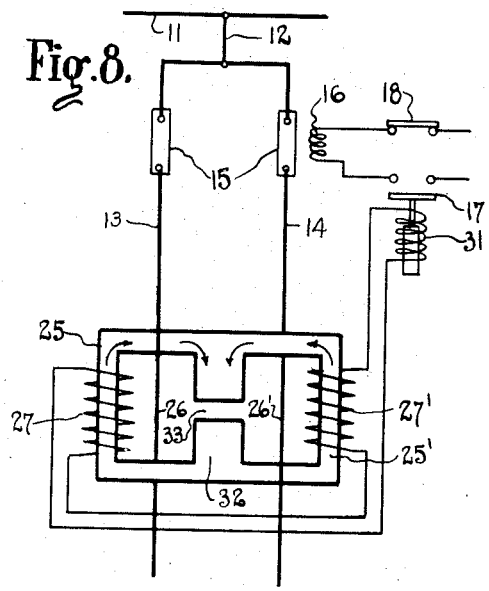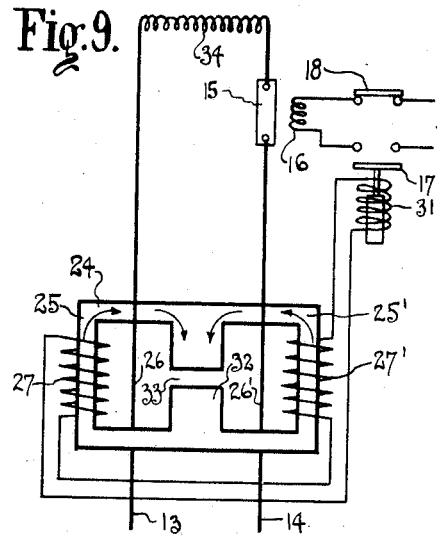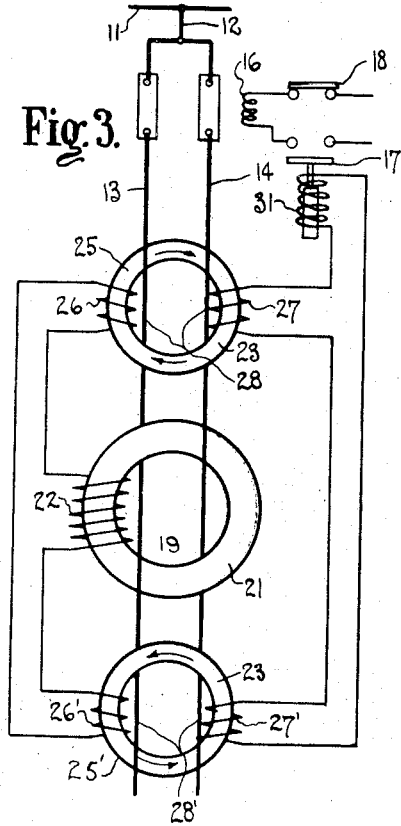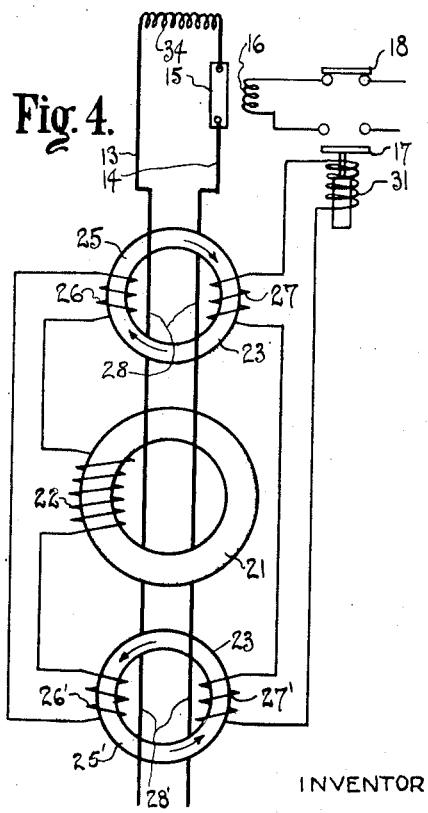

May 26, 1925.

A. S. FITZ GERALD

PROTECTIVE APPARATUS

Filed May 23, 1924

1,539,658

3 Sheets-Sheet 3

INVENTOR

Patented May 26, 1925.

1,539,658

UNITED STATES PATENT OFFICE.

ALAN S. FITZ GERALD, OF FINCHLEY, ENGLAND, ASSIGNOR TO GENERAL ELECTRIC COMPANY, A CORPORATION OF NEW YORK.

PROTECTIVE APPARATUS.

Application filed May 23, 1924. Serial No. 715,461.

*To all whom it may concern:*

Be it known that I, ALAN STEWART FITZ GERALD, a subject of the King of Great Britain, residing at Finchley, in the county of Middlesex, England, have invented certain new and useful Improvements in Protective Apparatus, of which the following is a specification.

This invention relates to protective arrangements and apparatus for electric alternating current systems, and particularly to such devices wherein the current in one part of the system is normally balanced against or compared with that in another part. The invention is applicable to the protection particularly of split-conductor cables, such as feeders and inter-connectors, but is not limited to such devices because it may equally well be applied to the protection of two parallel circuits or conductors or any two conductors when it is desired to disconnect both circuits in the event of a fault. The invention also has utility for the protection of transformers or machine windings or other apparatus.

In protective apparatus of this nature, it is required that protective relays energizing an auxiliary tripping or signaling circuit shall be operated on the occurrence of a fault within the zone embraced by the protective gear with certainty, yet it should be impossible for such operation to be caused by short-circuits or heavy overloads occurring in sections of the distribution system remote from the protected zone, and due to which extremely heavy currents may be caused to traverse the conductors with which the protective gear is associated. It has been found that, whereas small differences in the reactances or resistances of the conductors may be negligible when currents of the order of full load are being carried thereby, very heavy through currents may cause operation of the protective relays if these be set to clear faults of small magnitude. With systems operating with a neutral earthed through a resistance, it is most desirable that it should be possible to clear an earth fault on a cable at the minimum possible fault current. If, therefore, the relay be set to operate with a small difference of current under full load conditions, great care is essential that the said arithmetical difference be not exceeded when excessively heavy currents flow through the protected system. Suppose, for instance, a feeder rated at 300 amperes has protective gear arranged to trip at 30 amperes difference current; in this case operation will occur when carrying current of the order of full load if the fault effected sets up a difference current in the protective gear exceeding 10%. With the same setting, however, if the current in the feeder reaches a figure of 15 times full load, the balance between the two protected sections and also the inherent balance of the protective transformers must not be in error to an extent exceeding one-fifteenth of 10 per cent. Whilst this may be commercially achieved, it involves a considerable amount of adjustment and testing and it is, therefore, one object of my invention to show how protective apparatus of the biased type may be employed and adapted to operate when the percentage of out-of-balance current in relation to the total current flowing exceeds a predetermined value.

According to the present invention, the restraint is applied by statical means. I employ a static electric or biassing transformer comprising a magnetic structure having two core-parts, a primary or operating winding on said core-parts connected to receive operating current, a secondary winding inductively related to the primary winding for controlling the energization of an auxiliary tripping or signalling circuit and a restraining winding arranged so as to produce no potential at the terminals of the primary or secondary winding but to receive current for regulating the inductive relation between the primary and secondary windings. In a modification the primary winding is so arranged with respect to the secondary winding as automatically to regulate the inductive relation between the primary and secondary windings inversely as the load on the system.

The present invention, therefore, broadly consists in a protective arrangement comprising fixed windings operating on fixed members and arranged to effect the energization of an auxiliary circuit in response to a fault on the protected sections and to restrain the energization of the auxiliary circuit in response to out-of-balance conditions due to the protected sections being overloaded, such for instance as might arise when the system is called upon to feed a fault on the distant net-work. One or more transformers having a core or cores of magnetic material and a number of windings thereon, may be used, at least one of the windings being energized to effect the control of the auxiliary circuit when the difference of the currents in the protected sections reaches a predetermined percentage of normal load of either section.

Various methods of carrying out the invention are illustrated, by way of example, in the accompanying diagrammatic drawings. A description of the same will now be given to enable the invention to be more readily understood.

Figure 2:
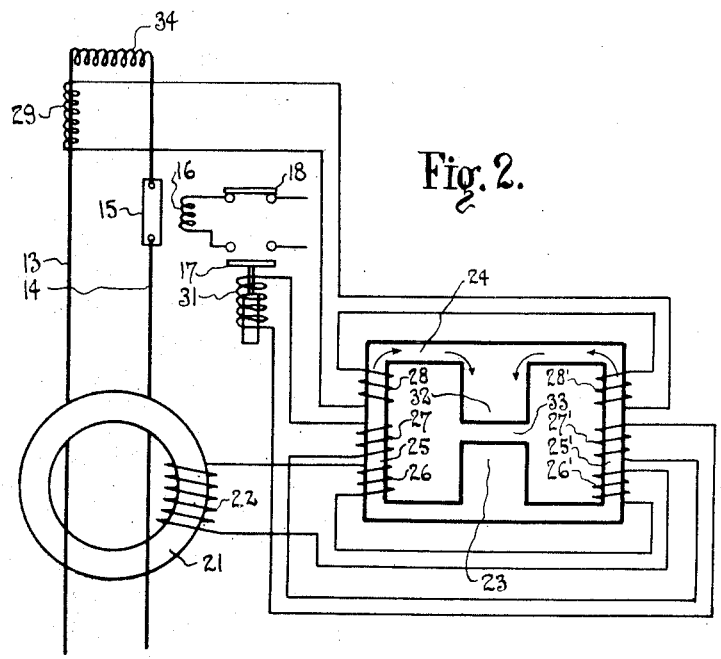
Figure 7:
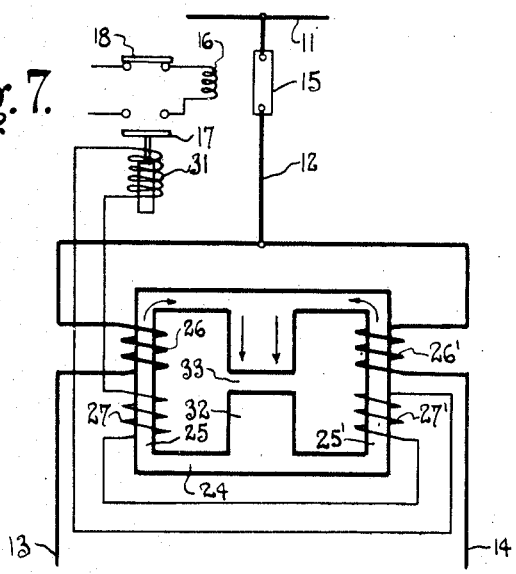
Figure 5:
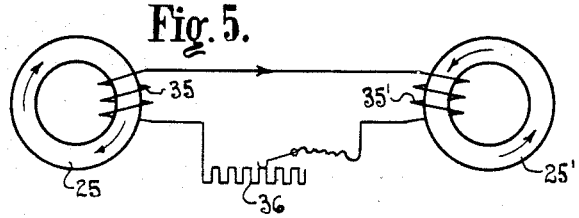
Figure 6:
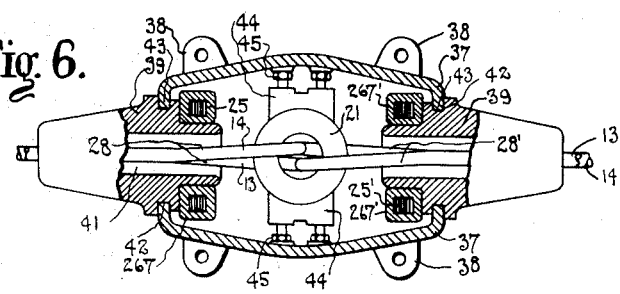

In the drawings, Fig. 1 represents a method of protecting a split-conductor cable by means of a split-conductor transformer and a biassing transformer. Fig. 2 shows a modification of Fig. 1 wherein the invention is applied to the protection of a machine or transformer-winding. Fig. 3 represents an arrangement which is substantially similar to that shown in Fig. 1, but in which the biassing transformer is in a different form. Fig. 4 shows the arrangement of Fig. 3 when applied to the protection of an electric winding. Fig. 5 is a modification which may with advantage be applied either to Fig. 3 or Fig. 4. Fig. 6 is a part-sectional view of apparatus constructed upon the lines indicated in Fig. 3. Fig. 7 shows an arrangement of a self-biassing transformer for protecting a split conductor cable wherein a split conductor transformer of the multi-turn type is combined with a biassing transformer into an integral unit. Fig. 8 is a modification of Fig. 7 wherein the split-conductor transformer is of the bar-primary type. Fig. 9 shows how the arrangement depicted in Fig. 8 may be applied to the protection of a machine or transformer-winding. Throughout the figures of the accompanying drawings like reference numerals are used whenever possible to designate similar parts, and the direction of the restraining flux for any given current in the restraining winding is indicated by the arrows on the magnetic structure.

With reference first to Fig. 1, 11 denotes a bus-bar or other electric conductor connected by a lead 12 to the split-conductor feeder comprising conductors 13 and 14, circuit-breakers 15 being arranged to control each of the conductors 13, 14. The circuit-breakers 15 are adapted to be operated by a tripping coil 16 when energized. The tripping coil 16 may be supplied from any suitable source of potential (not shown) and the circuit thereof is controlled by the relay-contacts 17. An additional switch 18 is shown in the circuit of the tripping relay 16, which switch is normally closed and is adapted to be operated by the circuit-breaker or breakers 15 upon the operation thereof, in a manner well understood in the art, in order to prevent the tripping circuit from being opened at the more delicate contacts 17. 19 represents a split-conductor transformer of the bar-primary type and comprises a core 21 of magnetic material adapted to surround each of the conductors 13, 14 in such a way that the magnetomotive-forces produced therein by the said conductors are normally equal and opposite. In the arrangement shown it is assumed that the conductors 13 and 14 in normal conditions carry equal currents. If they should, however, be designed to normally carry unequal currents, the ratio of which is constant, it will then be necessary to arrange the turns of each conductor upon core 21 so that the ampere-turns are equal and opposite to one another and produce no resultant magnetization of the core. This may be achieved, for instance, by having a bar-primary winding for that conductor which is rated to carry the heavier load, and a multi-turn primary winding for that conductor which is rated to carry the less load. A winding 22 is provided upon the core 21. The biassing transformer, designated generally by the reference numeral 23, comprises a magnetic structure 24 having two core-parts 25 and 25' upon each of which are arranged equal portions of a primary or operating winding 26, 26' respectively, equal portions of a secondary winding 27, 27' respectively, and equal portions of a restraining winding 28, 28' respectively. The restraining winding 28, 28' is connected to the secondary winding of a current-transformer 29, the primary winding of which is energized responsively to the load of the system. The secondary winding 27, 27' is connected to the relay-coil 31 so that current of a predetermined value in said secondary winding will energize relay-coil 31 to effect the operation of the relay-contact 17. Primary winding 26, 26' is connected to receive the current induced in the winding 22.

A consideration of the arrangement of the windings of the biassing transformer 23 will show that the primary winding 26, 26' is inductively related to the secondary winding 27, 27' and that the portions of the primary winding 26, 26' are arranged to produce a flux which will circulate around the structure 24, up one core-part (25) and down the other core-part (25') for any given current therein. The portions of restraining winding 28, 28' are arranged in such a way that no resultant potential will be induced therein when a current flows through the primary winding 26, 26', or vice versa. That is to say, the electromotive-force induced in the portion 28 of the restraining winding by current in the portion 26 of the primary winding is opposite to and balanced by the electromotive-force induced in the portion 28' of the restraining winding by current in the portion 26' of the primary winding. The restraining winding 28, 28' is, therefore, in effect, non-inductively related to the primary winding 26, 26', and consequently to the secondary winding 27, 27'. The fluxes due to a given current in the portions of the restraining winding 28, 28' flow up the core-parts 25 25' and together down an additional magnetic member 32 forming a part of the magnetic structure 24. An air gap 33, or an equivalent reluctance, may be provided in this additional magnetic member.

The operation of this arrangement is as follows: In normal conditions the currents flowing in the conductors 13 and 14 produce no resultant magnetization of the split-conductor transformer 19 and the winding 22 thereof is consequently not energized. Therefore the primary winding 26, 26' of the biassing transformer 23 remains de-energized and no electromotive-force can be induced at the terminals of the secondary winding 27, 27' by the restraining winding 28, 28', as these two windings are, in effect, non-inductively related one to another. The relay-contacts 17 are therefore in non-operated position, as shown in the Fig. In the event of a fault occurring upon the protected system, while the system is, in other respects, not overloaded, the core 21 of the split-conductor transformer 19 will be magnetized proportionally to the out-of-balance current in the conductors 13, 14, inducing thereby a current in the winding 22. The primary winding 26, 26' of the biassing transformer 23 is therefore energized. Meanwhile, current flowing in the restraining winding 28, 28' serves to magnetize the core-parts 25, 25' so as to reduce the inductive relation between the primary winding 26, 26' and the secondary winding 27, 27'. The effect of the air gap 33, in the magnetic circuit of the restraining winding 28, 28' is to reduce the regulating effect of said restraining winding at normal loads, and as, by assumption, the system is not overloaded, there is substantially no restraining effect. Consequently, therefore, the current induced in the secondary winding 27, 27' by the primary winding 26, 26' energizes the relay-coil 31 sufficiently to effect the operation of the relay-contacts 17, thus energizing the auxiliary circuit through the tripping coil 16, and opening the circuit-breakers 15. In abnormal conditions, however, when the conductors 13, 14 may be sound but called upon to carry a severe overload, as when feeding a fault in the net-work beyond the protected zone, slight difference currents flowing in the winding 22, due to inequalities in the primary windings of the split-conductor transformer 19, or due to other reasons, will excite the primary winding 26, 26' of the biassing transformer 23. It is desirable however, in these conditions that the current induced in the secondary winding 27, 27' shall not reach a value sufficient to effect the operation of the relay-contacts 17. This is achieved by the restraint applied by the restraining winding 28, 28'. The primary winding of the current transformer 29 is energized proportionally to the total current carried by the system and, consequently, the secondary output of this transformer is considerably in excess of its normal value. This relatively heavy current energizing the restraining winding 28, 28' produces a considerable flux in the magnetic structure 24 of the biassing transformer 23, and, in spite of air-gap 33 in the path of the restraining flux. the core-parts 25, 25' become sufficiently saturated for the inductive relation between the primary winding 26, 26', and the secondary winding 27, 27' to be reduced to a value at which insufficient current is induced in said secondary winding to effect the operation of the relay-contacts 17.

In Fig. 2 of the drawing the invention is applied to the protection of an electric winding 34. The conductors 13 and 14 connected to the terminals of this winding 34 carry currents which, in normal conditions, are equal but in opposite directions. In order that the core 21 may have no resultant magnetization from the currents in these conductors when conditions are normal, one of the conductors should be wound in the opposite way to that shown in Fig. 1. To illustrate this I have shown both the conductors passing through the core 21 in the same way. The primary winding of current-transformer 29 is shown as being energized by the total current carried by the system, and a single circuit-breaker 15 is arranged in conductor 14 to control the system. In other respects the arrangement is substantially the same as that described in connection with Fig. 1 and it is not considered necessary, therefore, to more fully explain the arrangement or the operation thereof.

With reference now to Fig. 3, I have shown an alternative method of protecting a split-conductor upon the lines indicated in Fig. 1. The arrangement of Fig. 3 comprises a construction of biassing transformer 23 wherein the core parts 25, 25' are separate ring-cores. In all other respects the arrangement of Fig. 3 and the windings upon the magnetic structure of the biassing transformer 23 are substantially the same as those shown in Fig. 1, with the exception that there is no air-gap reluctance in the path of the flux due to the restraining winding 28, 28' corresponding to the air-gap 33. A consideration of the windings will show that the restraining winding 28, 28' is constituted by the conductors 13, 14 themselves and is arranged to magnetize the ring-cores 25, 25' so that restraining flux circulates around each ring (as shown by the arrows). The portions 26, 26' of the primary winding are arranged upon the core-parts 25, 25' so that equal and opposite electromotive-forces will be induced therein by current in the restraining winding 28, 28' respectively. The secondary winding 27, 27' is inductively related to the primary winding 26, 26', and so both the primary and secondary windings are, in effect, non-inductively related to the restraining winding. It is assumed that the conductors 13, 14 normally carry equal currents. Should they be arranged to normally carry unequal currents of a constant ratio, the number of turns thereof upon the core 21 must be such as to not normally produce any resultant magnetization therein. The proportions of the windings are such that, in the event of a fault occurring upon either of the conductors 13 or 14 when the system is not overloaded by any other cause, the inductive relation between the primary winding 26, 26' and the secondary winding 27, 27' is not reduced by the restraining flux due to the restraining winding 28, 28' to an amount insufficient to prevent the energization of the relay-coil 31 to operate the relay-contacts 17. In view of the very full description of the apparatus and operation thereof, which has been given in connection with Fig. 1, it is not believed to be necessary to further explain the arrangement shown in Fig. 3.

The arrangement shown in Fig. 4 illustrates a method substantially similar to that shown in Fig. 3 for protecting an electric winding 34. In this case, however, the conductors 13, 14 carry currents, which, in normal conditions, are equal but in opposite directions. In order to apply the invention outlined in connection with Fig. 3 to the protection of a winding 34, it will be necessary that one of the conductors 13 or 14 shall be wound upon each of the cores 25, 21, 25' in the opposite directions to those shown in Fig. 3. This is shown in Fig. 4 wherein the conductors 13, 14 pass through the cores 25 and 25' in opposite directions but through the core 21 in the same direction. Only a single circuit-breaker 15 need be employed for controlling the system, but in all other respects the apparatus and the operation of the arrangement is substantially the same as in the case of Fig. 3.

In the arrangements illustrated in Figs. 3 and 4 no air-gap is shown in the magnetic circuit of the restraining winding as such an air-gap (in either or both of the core-parts 25, 25') would necessarily always reduce directly the inductive relation between the primary winding 26, 26' and secondary winding 27, 27'. In certain cases, however, it is preferable to reduce the effect of the restraining winding at normal loads to a negligible quantity (as was done in Figs. 1 and 2 by the air-gap 23 in the magnetic circuit of the restraining winding previously mentioned). This may be achieved by the use of an auxiliary winding having equal portions 35, 35' upon each of the core-parts 25, 25', said auxiliary winding 35 being short-circuited through a resistance 36 which may with advantage be adjustable. This additional winding 35, 35' is inductively related to the restraining winding 28, 28' (which is however not shown in this figure) as will be seen from the direction of current in the circuit of said additional winding, due to the restraining flux, as indicated by the arrow.

The operation of this arrangement is as follows:—When the resistance 36 is relatively high a small current only is induced in the additional winding 35, 35' by the restraining flux and the effect of the arrangement is, therefore, negligible; that is to say, the biassing transformer 23 will operate as though winding 35, 35' and resistance 36 were omitted. If, however, the resistance 36 is set for lower and suitable values, it then serves as the equivalent of an air gap in the magnetic circuit of the restraining flux. For normal values of current in the restraining winding 28, 28', and, therefore, for normal values of restraining flux, the current induced in the auxiliary winding 35, 35' produces a flux in opposition to that of the restraining winding and there is, therefore, at normal loads, substantially no restraining effect. When, however, the system is subjected to abnormal or overload conditions, the magnetic circuits of the restraining winding 28, 28', that is the core-parts 25, 25', approach saturation and the biassing effect of the restraining winding is then effective. Explained briefly the additional winding 35, 35' and the resistance 36 act to reduce the saturation of the core-parts 25, 25' by the restraining winding 28, 28' when conditions are normal. In heavy overload conditions, however, the core-parts 25, 25' become considerably saturated by the flux due to the restraining winding 28, 28' and the biassing effect thereof is then in evidence.

Fig. 6 illustrates somewhat diagrammatically a concrete example of the arrangement shown in Fig. 3. 37 is a casing comprising two half-cylinders provided with lugs 38 by which they are bolted or clamped together. Secured in the open ends of the casing are insulated portions 39 provided with channels 41 to accommodate the main conductors 13, 14. Peripheral grooves 42 on the portions 39 are adapted to receive the inturned ends 43 of the casing 37. The windings 26 and 27 are interleaved and designated generally by the numeral 267, and in like manner the windings 26' and 27' are designated 267'. The core 21 is supported by suitable insulating members 44 secured to the casing 37 by the bolts 45. The conductors 13, 14 will be seen in this figure to normally pass through the core 21 in opposite directions, and through the core-parts 25, 25', where they constitute the restraining winding 28, 28', in the same directions. The winding 22 is omitted from the core 21 for the sake of clearness.

The protective arrangement shown in Fig. 7 for protecting a split-conductor cable, the split sections of which normally carry equal currents, comprises, in effect, a biassing transformer of the three-limb type and a split-conductor transformer of the multi-turn primary winding type formed into one integral unit. Such an arrangement forms a self-biassing transformer. The conductors 13, 14 are wound upon the core parts 25, 25' so as to produce equal fluxes therein in opposed directions, constituting the primary winding, 26, 26'. These fluxes are added together in the additional magnetic member 32 as shown by the arrows on the structure 24. The portions of the secondary winding 27, 27' are connected in opposition so that, in normal conditions, equal electro-motive-forces are induced in said secondary winding by given currents in said primary winding and there is no resultant current flowing through the relay-coil 31. In the event of a fault occurring on the system the electro-motive-forces induced in the portions 27, 27' of the secondary winding are no longer balanced, the resultant current energizing the relay-coil 31 to effect the operation of the relay-contacts 17 to open the system. When the system is sound but heavily overloaded (in which conditions it is desirable that the system should not be cut out) the flux produced by the primary winding 26, 26' saturates the magnetic structure 24 to such an extent as automatically to reduce the inductive relation between said primary and secondary windings. Although there may be a considerable difference between the currents carried by the portions 26, 26' of the primary winding (which difference current would be sufficient to induce a current of the predetermined value in the secondary winding 27, 27' in normal conditions to effect the operation of the relay-contacts 17) yet this difference current will not be inductively effective on the secondary winding to the same extent because of the increased flux in the core-parts 25, 25'. The difference current, therefore, necessary to effect the operation of the relay-contacts 17 when heavy overload currents are carried by the system is augmented. It should be noticed, therefore, that the arrangement is such that the primary winding itself in these conditions functions as the restraining winding previously referred to in connection with the preceding figures; that is to say, the flux due to the primary winding in conditions of severe overload saturates the structure 24 so as to reduce the inductive relation between the primary and secondary windings in substantially the same manner as did the flux due to the restraining winding previously referred to. If, however, while the system is substantially overloaded a fault should occur on either of the conductors 13, 14, the difference between the currents carried by the portions of the primary winding 26, 26' will produce a corresponding current in the secondary winding 27, 27' sufficient to effect the operation of the relay-contact 17.

The arrangement shown in Fig. 8 is substantially similar to that of Fig. 7, except that the primary winding 26, 26' is shown as being a single turn. This arrangement is, in effect, a self-biassing transformer comprising the combination of a biassing transformer of the three-limb type with a split-conductor transformer of the bar-primary type in one integral unit. It is preferable to employ a circuit-breaker 15 in the circuits of each of the conductors 13, 14, as shown. The operation of the arrangement will be readily understood from the foregoing, it is believed, and no further description thereof will be given.

In Fig. 9 I show how the self-biassing transformer of Fig. 8 can be adapted for the protection of a single winding 34. As the currents in the conductors 13, 14 are now flowing in opposite directions, it is necessary that the primary winding 26, 26' be wound upon the magnetic structure 24 in the same directions, as shown, in order that it may produce fluxes in the core-parts 25, 25' which are in opposition.

Instead of providing the air-gap 33 in the self-biassing transformer shown in Fig. 7, 8 or 9, the arrangement depicted in Fig. 5 may be employed. The essential condition is that the portions 35, 35' of the auxiliary winding are arranged on the core-parts 25, 25' so as to be inductively related to the portions 26, 26' of the primary winding. The primary winding, it will be remembered, functions as a restraining winding in the self-biassing transformer. As the secondary winding 27, 27' is in effect, non-inductively related to the primary winding 26, 26' it will also be non-inductively related to the auxiliary winding 35, 35'.

In accordance with the provisions of the patent statutes I have described the principle of operation of my invention together with different kinds of apparatus which I consider to be suitable for carrying out the invention, and I desire it to be understood, however, that the apparatus shown is only illustrative and that the invention may be carried out by other means.

What I claim as new and desire to se- cure by Letters Patent of the United States, is:—

1. In an electric alternating current system, the combination of two conductors adapted to carry alternating currents of a predetermined ratio of magnitude, a magnetic structure adapted to be magnetized by the currents in the said conductors, a winding on said structure adapted to be excited only when said conductors carry currents differing from said predetermined ratio, and an electro-responsive device controlled in accordance with the current in said winding, said conductors and winding being so related to said structure as to regulate the effect of said current on said electro-responsive device inversely as the magnitude of the currents carried by said conductors.

2. In an electric alternating current system, the combination of two conductors adapted to carry alternating currents of a predetermined ratio of magnitude, a magnetic core adapted to be magnetized by the currents in said conductors, a winding on said core adapted to be excited only when said conductors carry currents differing from said predetermined ratio, a transformer having a primary winding connected in series with said winding and a secondary winding, means for regulating the inductive relation between said primary and secondary windings inversely as the current carried by said conductors and an electro-responsive device connected in series with said secondary winding.

3. In an electric alternating current system, the combination of two portions thereof, the ratio of the currents in which is normally substantially constant, with protective means comprising a static electric transformer, two magnetic core-parts therefor, a primary winding on said core-parts, a secondary winding on said core-parts inductively related to said primary winding, a restraining winding on said core-parts arranged so as to produce substantially no electro-motive force at the terminals of said primary or secondary winding but to regulate when energized the inductive relation between said primary and secondary windings, a magnetic core adapted to be magnetized in opposed directions by currents in said portions but to have no resultant magnetism when conditions are normal, a winding thereon connected to supply operating current to said primary windings, said operating current being substantially proportional to the difference between the ratio of the currents in said portions and said constant ratio, and an electro-responsive device arranged to be controlled by the resultant current induced in said secondary winding.

4. In an electric alternating current system including two conductors adapted normally to carry equal currents, protective means comprising in combination a static electric transformer, a core therefor, a primary winding on said core, a secondary winding on said core inductively related to said primary winding, a restraining winding on said core arranged so as to produce substantially no electromotive force at the terminals of said primary or secondary winding but to regulate when energized the inductive relation between said primary and secondary windings, an air-gap in the magnetic circuit of said restraining winding adapted to control the restraining effect thereof, a magnetic core adapted to be magnetized in opposed directions by currents in said conductors, a winding thereon connected to supply operating current to said primary winding, said operating current being substantially proportional to the difference between the currents in said conductors, and an electro-responsive device arranged to be controlled by the resultant current induced in said secondary winding.

5. In an electric alternating current system including two conductors adapted normally to carry equal currents, protective means comprising in combination a static electric transformer, a magnetic structure therefor having two core-parts, a primary winding on said core-parts, a secondary winding on said core-parts inductively related to said primary winding, a restraining winding on said core-parts arranged so as to produce substantially no electromotive force at the terminals of said primary or secondary winding but to regulate when energized the inductive relation between said primary and secondary windings, means comprising a short circuit winding inductively related to said restraining winding adapted to control the restraining effect thereof, a magnetic core adapted to be magnetized in opposed directions by currents in said conductors, a winding thereon connected to supply operating current to said primary winding, said operating current being substantially proportional to the difference between the currents in said conductors, and an electro-responsive device arranged to be controlled by the resultant current induced in said secondary winding.

6. In an electric alternating current system, the combination of two conductors with protective means comprising two magnetic cores and a third magnetic core, windings on each of said cores energized in accordance with the current in each of said conductors, said windings being arranged so as to magnetize said two cores in a like sense and said third core in an opposed sense, other windings on each of said cores connected in series, said other windings on said two cores being connected in opposition so as to have no resultant voltage induced therein by the magnetization of said two cores, additional windings on said two cores connected in the same sense and short-circuited by a resistance, and a secondary winding on said two cores comprising equal portions connected in opposition and controlling an eletro-responsive device, the arrangement being such that operation of the electro-responsive device is effected only when the difference between the currents carried by said conductors reaches approximately a predetermined percentage of either current.

7. In an electric alternating current system, protective means comprising the combination of two conductors of the system, a magnetic core adapted to be equally magnetized in opposed directions by currents in said conductors, an additional magnetic portion on said core providing a common path for the fluxes due to said conductors, said additional portion being provided with a high reluctance, a divided winding on said core, the portions of said divided winding being inductively related to said conductors but arranged so that in normal conditions the voltages induced therein are balanced, and an electro-responsive device controlled by the resultant current induced in said divided winding, the arrangement being such that said electro-responsive device is operated only when the difference between the currents carried by the said conductors reaches approximately a predetermined percentage of either current.

8. In an electric alternating current system including two conductors, the combination therewith of protective means comprising a magnetic structure adapted to be magnetized by currents in said conductors, a divided winding on said structure, the divided winding being arranged so that in normal conditions no electro-motive force is induced at the terminals thereof by said conductors, means for automatically controlling the magnetization of said structure responsively to the current in said system, and an electroresponsive device adapted to be operated by a predetermined value of current in said divided winding when conditions are abnormal, the arrangement being such that the inductive relation between said conductors and divided winding is controlled in accordance with the current in said system whereby said electro-responsive device is operated only when the difference between the currents carried by the said conductors reaches approximately a predetermined percentage of either current.

9. In an electric alternating current system, protective means wherein the current in one portion of the system is balanced against the current in another comprising a self-biassing transformer, a core therefor, a divided primary winding on said core arranged to be energized in accordance with the current in said portions of the system and to magnetize the core equally in opposed directions, a divided secondary winding on said core inductively related to said primary winding, an additional magnetic portion arranged to provide a common path for the fluxes due to said primary winding, an air-gap in said additional portion, and means for controlling the circuit of said system adapted to be operated by a predetermined resultant current induced in said secondary windings.

10. In an electric alternating current system, protective means wherein the current in one portion of the system is normally balanced against the current in another comprising in combination a self-biassing transformer, two magnetic core-parts therefor adapted to be magnetized equal amounts, respectively, by the currents in said balanced portions, a divided secondary winding having equal portions on said core-parts connected in opposition so that normally no current is induced therein by current in said balanced portions, and an electro-responsive device controlled by the current in said secondary winding, the arrangement being such that operation of the electro-responsive device is effected only when the difference between the currents carried by said balanced portions reaches approximately a predetermined percentage of either current.

11. In an electric alternating current system, protective means wherein the current in one portion of the system is normally balanced against the current in another portion comprising a self-biassing transformer, two magnetic core-parts therefor adapted to be magnetized equal amounts in accordance with the currents in said balanced portions, a divided secondary winding having equal portions on said two core-parts connected in opposition, means for controlling the inductive relation between said balanced portions and said secondary winding comprising an auxiliary winding short-circuited by a resistance, and an electro-responsive device controlled by the current in said secondary winding, the arrangement being such that operation of the electro-responsive device is effected only when the difference between the currents carried by said balanced portions reaches approximately a predetermined percentage of either current.

In witness whereof, I have hereunto set my hand this 13th day of May 1924.

A. S. FITZ GERALD.